(12) United States Patent
Ho

(10) Patent No.: US 6,970,265 B2
(45) Date of Patent: Nov. 29, 2005

(54) DIGITAL IMAGE PROCESSING DEVICE AND DIGITAL CAMERA USING THIS DEVICE

(75) Inventor: Wen-Jen Ho, Hualien (TW)

(73) Assignee: Institute for Information Industry, Taipei (TW)

( * ) Notice: Subject to any disclaimer, the term of this patent is extended or adjusted under 35 U.S.C. 154(b) by 1054 days.

(21) Appl. No.: 09/735,074

(22) Filed: Dec. 12, 2000

(65) Prior Publication Data

US 2002/0036801 A1 Mar. 28, 2002

(30) Foreign Application Priority Data

Sep. 26, 2000 (TW) .............................. 89119821 A

(51) Int. Cl.$^7$ ............................................ G06F 15/00
(52) U.S. Cl. ..................... 358/1.16; 382/232; 382/235; 358/426.05
(58) Field of Search ............................. 358/1.16, 1.17, 358/426.05; 382/240, 232, 233, 235, 248, 382/231; 348/231

(56) References Cited

U.S. PATENT DOCUMENTS

| | | | | |
|---|---|---|---|---|
| 5,014,134 A | * | 5/1991 | Lawton et al. ............... | 382/240 |
| 5,412,741 A | * | 5/1995 | Shapiro ....................... | 382/232 |
| 5,703,965 A | * | 12/1997 | Fu et al. ...................... | 382/232 |
| 5,754,793 A | * | 5/1998 | Eom et al. ................... | 709/247 |
| 6,101,284 A | * | 8/2000 | Matsubara et al. .......... | 382/260 |
| 6,173,079 B1 | * | 1/2001 | Hwang ........................ | 382/239 |
| 6,215,916 B1 | * | 4/2001 | Acharya ...................... | 382/298 |
| 6,229,926 B1 | * | 5/2001 | Chui et al. ................... | 382/240 |
| 6,266,414 B1 | * | 7/2001 | Bradley et al. ............. | 380/240 |
| 6,389,160 B1 | * | 5/2002 | Chui et al. ................... | 382/166 |
| 6,760,481 B1 | * | 7/2004 | Chebil et al. ................ | 382/240 |
| 6,792,153 B1 | * | 9/2004 | Tsujii ........................... | 382/239 |
| 2001/0036231 A1 | * | 11/2001 | Easwar et al. .......... | 375/240.19 |

FOREIGN PATENT DOCUMENTS

JP 11263425 * 4/2001 ............. G09F 9/00

* cited by examiner

Primary Examiner—Mark Wallerson
(74) Attorney, Agent, or Firm—Thomas, Kayden, Horstemeyer & Risley

(57) ABSTRACT

A digital image processing device, more particularly, a digital camera, which includes: a static digital image extracting device used to extract the static digital image and output; a compressing device used to compress the static digital image using wavelet transform to produce a compressed image data file; a memory card used to store the compressed image data file; a central processing unit used to calculate and compare the storage space left in the memory card, storage space used in the memory card and the size of the compressed image data file, when the storage space left in the memory card is less than the size of the compressed image data file, part of the image data file stored in the memory is eliminated to store the compressed image data file, otherwise the compressed image data file is directly stored in the memory card; a decompressing device used to decompress the compressed image data file to produce an image data file; and an image display device used to display the image data file.

7 Claims, 2 Drawing Sheets

DIGITAL IMAGE PROCESSING DEVICE AND DIGITAL CAMERA USING THIS DEVICE

BACKGROUND OF THE INVENTION

1. Field of the Invention

The present invention relates to a digital image processing device, more particularly to an image processing device of a digital camera.

2. Description of the Prior Art

At present, the storage method for photographs of digital cameras uses the JPEG compressing technique to compress the photograph and then store the compressed data. However, this method cannot process the compressed data flexibly, therefore cannot maximize the use of memory devices.

The conventional JPEG compressing technique uses Discrete Cosine Transform (DCT) coding method. In this method, imagine an image is a brick wall constructed by the DCT coefficients, the brick is constructed by individual DCT block. Compressing data can be seen as knocking the end portion of the brick and exposing the indentations and compressing the bricks with indentations. The compressed brick wall leaves filling slits and obscures the image (see FIG. 1). Furthermore, if part of the image data is eliminated to store the rest of the image data in the limited space, then part of the image may be lost. For example, an image which was originally a person's figure may lose its upper half, leaving the lower half intact.

FIG. 2 shows the conventional digital camera, including: a lens 1, a JPEG compressing device 2, a memory device 3, a decompressing device 4, and an image display device 5. Lens 1 is used to take in a digital image. JPEG compressing device 2 is used to compress the input digital image. The memory device 3 is used to store the compressed digital image. The decompressing device 4 is used to decompress the compressed digital image stored in the memory device 3. The image display device 5 (for example, liquid crystal display or computer) is used to display the decompressed image data file. Here, the image stored in the memory device 3 cannot be trimmed and thus the use of the memory device 3 cannot be maximized.

SUMMARY OF THE INVENTION

According to the above, the object of the present invention is to provide an image processing device, suitable for displaying a static digital image on an image display device. The image processing device includes: a compressing device used to compress the static digital image using a wavelet transform to produce a compressed image data file; a processing device used to calculate and compare the storage space left by the memory device, the storage space used, and the size of the compressed image data file. When the storage space left is less than the compressed image data file, part of the image data stored is eliminated to store the compressed image data file. Otherwise, the compressed image data file is stored directly in the memory device; and a decompressing device used to decompress the compressed image data file to produce the image data tile and display the image data file on the display device.

The size of the image data eliminated is equally divided among the individual image data files. The eliminated part of the image data stored is the end portion of the compressed image data file stored in the memory device.

Furthermore, a digital camera is provided, including a static digital image extracting device used to extract the static digital image; a compressing device used to compress the static digital image using the wavelet transform to produce a compressed image data file; a memory card used to store the compressed image data file; a central processing unit used to calculate and compare the memory storage space left in the memory card, the storage space used and the size of the compressed image data file, when the memory storage space left is less than the compressed image data file, part of the image data stored is eliminated to store the compressed image data file, otherwise, the compressed image data file is directly stored in the memory card; a decompressing device used to decompress the compressed image data file to produce an image data file; and an image display device used to display the image data file.

The size of the eliminated part of the image data is equally divided among the individual compressed image data file. The eliminated part of the compressed image data file is the end portion of the compressed image data file stored in the memory card. In addition, the static digital image extracting device is a camera lens, and the image display device is a liquid crystal display or a computer.

DETAILED DESCRIPTION OF THE INVENTION

Figure 1:
FIG. 1 shows the image being processed by JPEG compressing technique.
Figure 2:
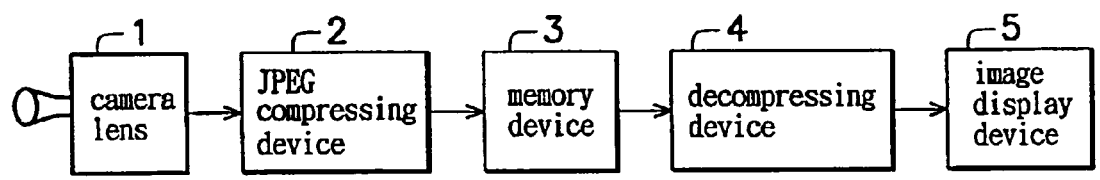
FIG. 2 shows the block diagram of the structure of the conventional digital camera.
Figure 3:
FIG. 3 shows the image being processed by JPEG compressing technique.

Embodiment:

The present invention uses the JPEG 2000 gradual compressing technique. JPEG 2000 uses a wavelet transform multi-resolution coding method. This method has been used in U.S. Pat. Nos. 6,041,143 and 6,069,977. The difference between this method and the DCT of JPEG is that, in wavelet transform, the irregular indentation produced occurs on the edge, i.e., the intersection of two lines. On the compressed brick wall, because the degree of the edge match is better, the slit produced by the compression is not easy to see, thus generating a smoother viewing effect (see FIG. 3). At the same time, wavelet transform technique allows the JPEG 2000 to be more flexible, so that when receiving part of the image, a full picture can be seen.

Figure 4:
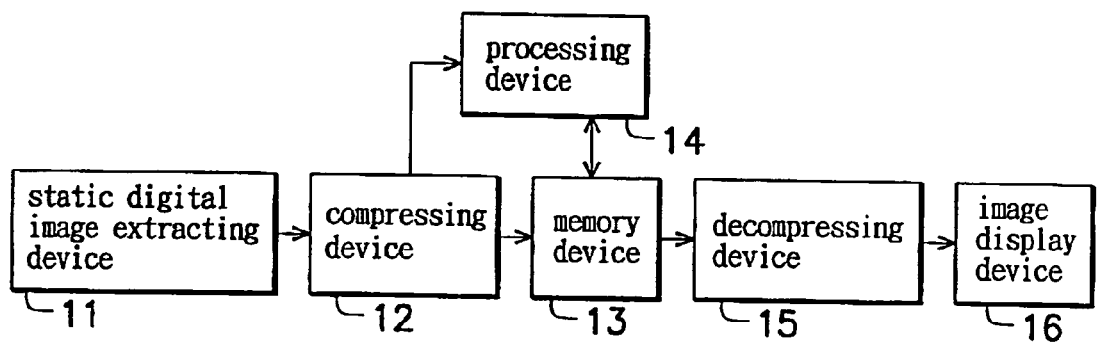
FIG. 4 shows the block diagram of the structure of the digital image processing device in accordance with the present invention.

FIG. 4 shows the digital image processing device according to the present invention. The image processing device of the present invention is suitable for the static image extracting device (for example, a lens) 11 displaying the static digital image on the display device (for example, a liquid crystal display or a computer) 16. The image processing device includes: a compressing device 12, a memory device 13, a processing device 14, and a decompressing device 15. The compressing device (for example, the JPEG 2000 compressing device) 12 compresses the static digital image from the static digital image extracting device 11 using the wavelet transform to produce a compressed image data file and output the compressed image data file to the memory device 13. The memory device 13 is used to store the compressed image data file from the compressing device 12. The processing device 14 is used to calculate and compare the storage space left in the memory device, the storage space used and the size of the compressed image data file, when the storage space left is less than the compressed image data file, then part of the image data stored in the memory device is eliminated to store the compressed image data file from the compressing device 12, otherwise the compressed image data file from the compressing device 12 is directly stored in the memory device 13; wherein the size of the eliminated part of the image data stored in the memory device is equally divided among the individual compressed image data file stored in the memory device, and the eliminated part of the image data is the end portion of the individual compressed image data file stored in the memory device. The decompressing device 15 is used to decompress the compressed image data file from the memory device 13 to produce the image data file and displays them on the display device 16.

In detail, an image is input through the static digital image extracting device 11, and is compressed by the JPEG 2000 compressing device 12, and performs the wavelet transform to produce compressed image data file. Then, the processing device 14 calculates the storage space left in the memory device, the storage space used and the size of the compressed image data file. When the storage space left in the memory device 13 is greater than or equal to the compressed image data file, the compressed image data file is directly stored in the memory device 13. When the storage space left in the memory device 13 is less than the compressed image data file, then the size (N) of the compressed image data file is divided by the number of images stored in the memory device (X), and N/X bits of each image stored in the memory device is eliminated. The eliminated bit data is the end portion of the compressed image data file, which is the high frequency data, so the original resolution of the image can be maintained. The compressed image data file stored in the memory device 13 is then decompressed and output to the image display device 16.

Figure 5:
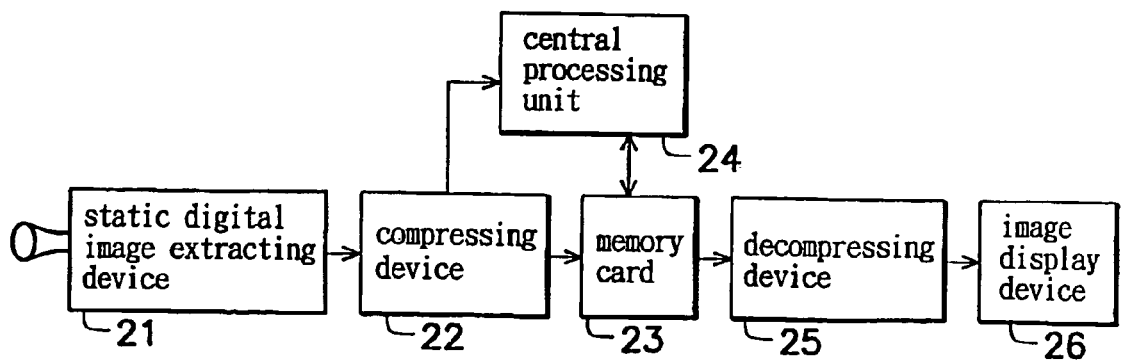
FIG. 5 is the block diagram of the structure of the digital camera in accordance with the present invention.

FIG. 5 is a block diagram of the structure of the digital camera. The digital camera of the present invention includes: a static digital image extracting device 21, a compressing device 22, a memory card 23, a central processing unit 24, a decompressing device 25 and an image display device 26. The static digital images extracting device (for example, lens) 21 is used to extract static digital image, and output to the compressing device 22. The compressing device (for example, JPEG 2000 compressing device) 22 is used to compress the static digital image using the wavelet transform to produce the compressed image data file. The memory card 23 is used to store the compressed image data file from the compressing device 22. The central processing unit (CPU) 24 is used to calculate and compare the storage space left in the memory card, the storage space used in the memory card, and the size of the compressed image data file, when the storage space left in the memory card is less than the size of the compressed image data file, part of the compressed image data in the memory is eliminated, otherwise the compressed image data from the compressing device 22 is directly stored in the memory card 23; wherein the eliminated part of the image data is equally divided among the individual compressed image data file stored in the memory card, and the eliminated part is the end portion of the individual compressed image data file stored in the memory card. The decompressing device 25 is used to decompress the compressed image data file from the memory card 23 to produce an image data file and output to the image display device 26. The image display device 26 (for example, a liquid crystal display or a computer) is used to display the image data file.

In detail, a static digital image signal is taken in by a camera lens 21. The signal is input to the JPEG 2000 compressing device 22 and compressed using wavelet transform to produce a compressed image data file. The processing device 24 calculates the storage space left in the memory card 23 and the storage space used in the memory card and the size of the compressed image data file, and compare the storage space left in the memory card 23 and the size of the first compressed image data file. When the storage space left in the memory card 23 is greater than or equal to the size of the compressed image data file, the compressed image data tile is directly stored in the memory card 23. When the storage space left in the memory card is less than the compressed image data file, the size of the compressed image data file (N) is divided by the number of images (X) in the memory card 23. The N/X bits of the end portion of each individual compressed image data file in the memory are eliminated. Since the data at the end portion of the data file is the high frequency data, the image can maintain its original resolution. Thereafter, the stored image can be decompressed by the decompressing device and then sent to the output device such as a liquid crystal display or a computer. In case of taking in another photograph, the above steps can be repeated. It is noted that when number of images stored in the memory device is increased, the compressing rate is increased, and the resolution is decreased.

The advantages of the present invention includes maximizing the use of the memory device; since the gradual compressing technique is used, the quality of the image being trimmed can be maintained; and users can determine the quality of the images as requested.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image processing device, suitable for displaying a static digital image on an image display device, comprising:
a compressing device used to compress the static digital image using a wavelet transform to produce a first compressed image data file;
a memory device used to store the compressed image data file;
a processing device used to calculate and compare the storage space left in the memory device, the storage space used in the memory device and the size of the first compressed image data file, when the storage space left in the memory device is less than the size of the first compressed image data file, part of the compressed image data files stored in the memory device is eliminated to store the first compressed image data file, otherwise the first compressed image data file is directly stored in the memory device, wherein the size of the eliminated part of the image data files is equally divided among the compressed image data files stored in the memory device; and a decompressing device used to decompress the first compressed image data file to produce image data file, and display it on the image display device.

2. The image processing device as claimed in claim 1, wherein the eliminated part of the image data files is the end portion of the compressed image data files stored in the memory device.

3. A digital camera, comprising:
a static digital image extracting device, used to extract static digital images and output;
a compressing device, used to compress the static digital image using a wavelet transform to produce a first compressed image data file;
a memory card, used to store the first compressed image data file;
a central processing unit, used to calculate and compare the storage space left in the memory card, the storage space used and the first compressed image data file, when the storage space left in the memory card is less than the first compressed image data file, part of the compressed image data files in the memory card is eliminated to store the first compressed image data file, otherwise the first compressed image data file is directly stored in the memory card, wherein the size of the eliminated part of the compressed image data files in the memory card is equally divided among the compressed image data files stored in the memory card;
a decompressing device, used to decompress the first compressed image data file to produce the image data file; and
an image display device used to display the image data file.

4. The digital camera as claimed in claim 3, wherein the eliminated part of the compressed image data files is the end portion of each of the individual compressed image data files stored in the memory card.

5. The digital camera as claimed in claim 4, wherein the static digital image extracting device is a camera lens.

6. The digital camera as claimed in claim 5, wherein the image display device is a liquid crystal display.

7. The digital camera as claimed in claim 5, wherein the image display device is a computer.

* * * * *